April 26, 1966 R. J. CORSI 3,248,202
PIVOTED GLASS SHEET BENDING MOLD
Filed Nov. 5, 1962 2 Sheets-Sheet 1

INVENTOR.
RUSSELL J. CORSI
BY Oscar L. Spencer
ATTORNEY

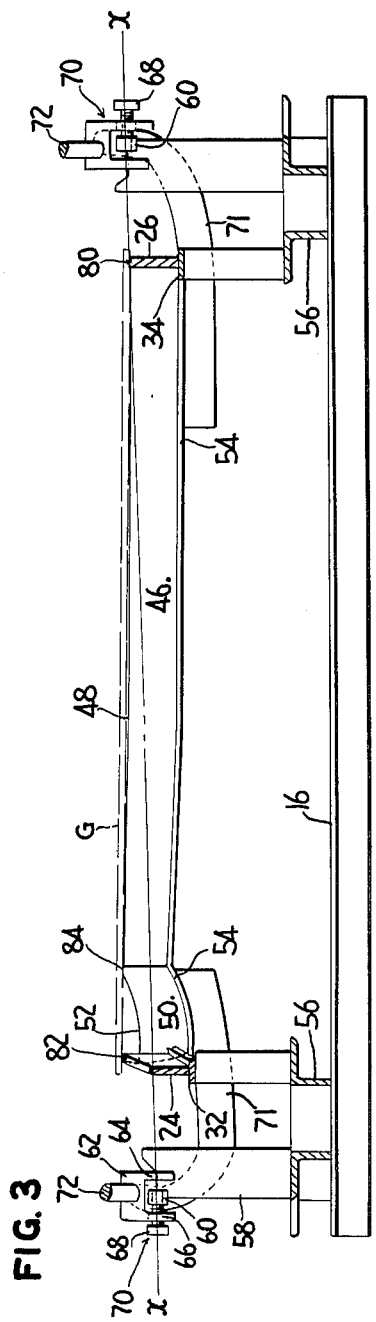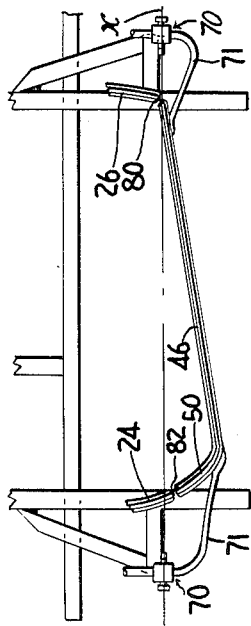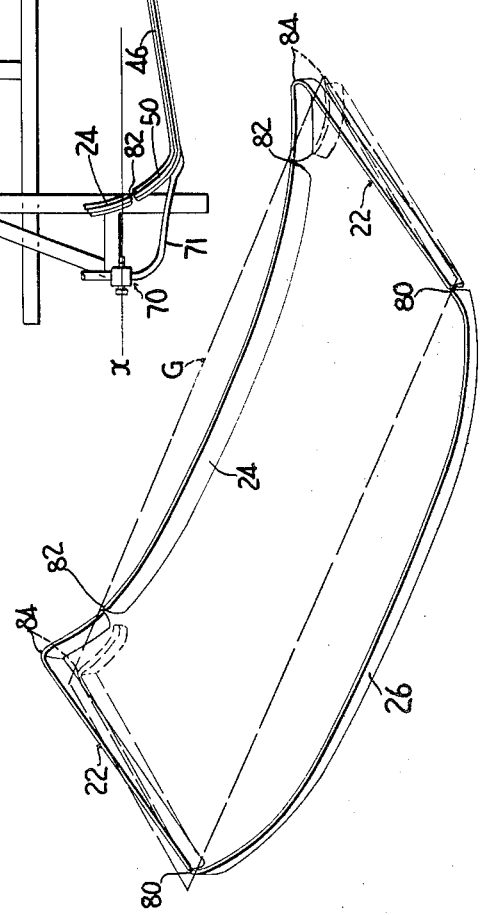
INVENTOR.
RUSSELL J. CORSI
BY
Oscar L Spencer
ATTORNEY

United States Patent Office 3,248,202
Patented Apr. 26, 1966

3,248,202
PIVOTED GLASS SHEET BENDING MOLD
Russell J. Corsi, Tarentum, Pa., assignor to Pittsburgh Plate Glass Company, Pittsburgh, Pa., a corporation of Pennsylvania
Filed Nov. 5, 1962, Ser. No. 235,254
5 Claims. (Cl. 65—291)

The present invention relates to Bending Glass Sheets, and particularly relates to eliminating areas of distortion in the viewing area of curved glazing closures produced by bending flat glass sheets into non-uniformly curved glass sheets.

The flat glass industry has developed sectionalized, skeletonized glass sheet bending molds for bending glass sheets of nonrectangular outline to non-uniform curvatures. These molds have an outline shaping surface of concave elevation formed by a center mold section comprising spaced, elongated rails and end mold sections pivoted to the center mold section by means of hinges for movement from a spread mold position to support a flat glass sheet and into a closed mold position wherein the end mold members form continuations of the center section rails to form an outline shaping surface that supports the undersurface of the glass sheet after bending along its marginal portion.

The mold members or sections are usually composed of stainless steel or other high temperature material. Such molds are especially effective in producing "wrap-around" windshields extending continuously across the entire front of a vehicle and having their longitudinal extremities curved sharply into the sides of the vehicle relative to a gently bent central region. The mold sections have upper edge surfaces that are concave in elevation to conform to different portions of the shape desired near different edge portions of the glass sheet. The end mold members are preferably counterweighted to rotate upward from the spread mold position to the closed mold position.

To support glass sheets of nonrectangular outline in nontilting relation, the prior art molds were constructed with arms attached to the pivoting end sections to support the glass sheets intermediate their ends. Such arms were located inward of the marginal regions of support for the bent glass provided by the outline shaping surface of the mold. These arms had to be constructed very precisely to avoid establishing kinks in the viewing area of the bent glass.

An improved mold to provide nontilting support for the flat glass had its mold sections constructed and arranged with respect to the hinges in such a manner that the longitudinal extremities of the center mold section rails contacted the undersurface of the flat glass sheet intermediate its longitudinal extremities and adjacent its edges when the end sections were rotated into the spread mold position. Such a construction is disclosed in U.S. Patent No. 2,924,045 to Paul Startzell.

The most effective molds of this type in the prior art include a frame support, a central mold member comprising spaced rails rigidly attached to the frame support and end mold members comprising curved rails pivoted with respect to the central mold member. When the end mold members rotate into a spread mold position, they support the flat glass sheet as a beam adjacent the longitudinal extremities of the sheet. The glass sheet is also supported near its edge and intermediate its ends by the ends of the center molding member rails.

According to the present commercial practice, such glass-laden molds are successively conveyed laterally through a tunnel-like bending lehr. In the lehr, the molds are first conveyd through a preheat zone where they are exposed to successive patterns of increasing temperatures until they reach a temperature just below the glass softening point. Then they are exposed to a bending zone whose temperature pattern includes spaced regions of relatively high temperature that irradiate the regions of the glass sheet to be bent sharply. This latter temperature pattern is necessary because the portions of the glass sheet to be bent sharply must pass through the spaced regions of relatively high temperature while the central portions of the glass sheets which are to be bent relatively gently simultaneously pass through the intermediate regions of relatively low temperature.

When glass-laden molds are subject to glass softening temperatures, the central portion of the glass sheet sags to conform to the upper shaping surfaces of the center molding member rails, while the end mold members rotate upward into the closed mold position, thus lifting the softened glass sheet extremities from a flat to a curved configuration.

In the past, the mold sections were constructed of such lengths that the center section rail extremities which supported the flat glass sheets intermediate their ends were located longitudinally inward of the regions of sharpest bend. Such construction is illustrated in U.S. Patent No. 2,924,045 to Startzell and British Patent No. 770,131. It was believed that misalignment between the glass sheet and the mold would be minimized by reducing the distance the glass sheet must sag to reach the lowest portion of the concave shaping surface of the mold. Each end mold section was of generally U-shape or C-shape configuration and had a leg extending longitudinally inward from a longitudinal end of the mold along each side edge of the outline mold shaping surface toward an extremity of each center section rail.

Since metal and glass have different softening points, the portions of the softened glass sheets resting on the ends of the relatively hard center section rails tend to become kinked as the glass-laden mold is heated. This tendency increases when the intermediate support regions of the shaping surface traverse the bending zone through or near the high temperature regions of the temperature patterns as was the case prior to the present invention.

As a result of the knowledge imparted to the glass bending art by the present invention, it has been discovered that the reason for this phenomenon is that flat glass sheets supported intermediate their extremities inward of the regions to be heated most severely tend to develop a kink at the regions of support when the glass sheet softens while undergoing bending. These kinks result from the center of the glass sheet inward of the intermediate supports sagging toward the center section rails while the portion of the glass outward of the intermediate supports and longitudinally inward of the ends of the sheet also sags.

Such kinks appear as regions of distortion that are obvious when an occupant looks obliquely through the bent glass sheet installed in a vehicle. This characteristic is termed "cross car distortion" in the art.

The present invention has reduced "cross car distortion" considerably by supporting the flat glass sheets adjacent their longitudinal extremities and only at intermediate regions adjacent their side edges that lie longitudinally outward of each region of sharpest bend. Surprisingly, this change in the location of the intermediate regions of support from longitudinally inward of the sharply bent regions to longitudinally outward thereof has caused several additional improvements in the glass bending operation.

Another improvement resulting from the present invention involved lessening the mass required for the counterweights needed to lift the smaller end portions of glass sheets that had to be folded upward and the relatively light end mold sections which supported the glass end portions. This reduction in the mass of the metal bending molds permitted a reduction in thermal energy consumption in the lehr per unit of glass sheet bent, because less furnace heat was consumed by absorption by the relatively light molds of the present invention than by the relatively massive ones of the prior art.

Another improvement resulting from the present invention was completely unexpected in view of the beliefs of the prior art. This is a reduction in frequency of misalignment of the glass sheet relative to the bending mold.

This tendency for misalignment along the longitudinal axis of the mold is caused by one end section rotating upward a sufficient distance to displace the supported flat glass sheet longitudinally of the mold before the other end section begins to pivot. Molds constructed according to the present invention are less likely to produce this source of failure than the prior art because the molds employ smaller weights to lift the end sections and support more weight of the glass inside the lifted region. The use of smaller turning forces working on larger effective masses reduces the likelihood of misalignment.

Misalignment of the glass sheet transversely of the mold is also reduced because the present invention spaces the intermediate supports for the flat glass sheet farther apart from one another than in prior art molds. Therefore, a greater proportion of the mass of the flat glass sheets is supported on the fixed rail extremities and a lesser proportion on the upwardly biased end sections than in the prior art. Hence, sudden starts and stops of the mold are less likely to cause transverse misalignment than formerly.

Still another improvement envisioned by the present invention is the selective placement of unavoidable distortion areas due to any residual kinking while bending glass sheets having outlines that make it impossible to eliminate distortion areas completely. In such cases, the present invention makes it possible to locate unavoidable distortion areas along the bottom regions of the bent windshield where a driver or other passenger is not likely to look, since automobile occupants are not interested in looking at the vehicle's hood while seated in a vehicle.

The present invention teaches a novel method of supporting a flat glass sheet for bending on an outline sectionalized skeleton mold. According to the present invention, the flat glass sheet is supported only on portions of the outline shaping surface that lie outwardly of the regions of sharpest bending. The glass sheet is shaped to conform to the mold shaping surface by a continuation of heat-sagging and upward lifting in which the entire area of the glass sheet ultimately supported within the outline shaping surface is maintained out of contact with a solid member. Where the outline of the sheet does not permit the complete avoidance of distortion areas, the present invention teaches supporting the flat glass for bending in such a manner that the areas of distortion are localized at the bottom of the curved windshield. In order to accomplish the purpose of the present invention, certain structural changes are suggested for the bending apparatus.

The novel apparatus of the present invention comprises a central molding section including a pair of elongated shaping members extending along the opposite longitudinal sides of the outline shaping surface of the mold and a longitudinally extending leg. Hinge means pivotally supporting each end molding section with respect and a longitudinally extending leg. Hinge means pivotally supporting each end molding section with respect to the central molding section permits the latter to move between a spread position for supporting a flat glass sheet for bending and a closed mold position. In the latter position, the free ends of said transverse legs are in juxtaposition to the opposite longitudinal extremities of one of said pair of elongated shaping members and the free ends of said longitudinal legs are in juxtaposition to the longitudinal extremities of the other of said pair of elongated shaping members.

The extremities of the elongated shaping members which support the flat glass sheets near their edges and intermediate the longitudinal ends thereof are located longitudinally outward of the regions of sharpest bend. Thus, the present invention provides both a rigid support and an upwardly moving support for the glass sheet outward of the region thereof subjected to maximum heating. This combination of supports reduces the kinking incidental to prior art apparatus.

In a specific illustrative embodiment of the present invention, the hinge means for each end molding section is disposed as a pair of hinges for each end molding section. The line interconnecting a pair of hinges forms an axis extending across the upper shaping surface of the outline mold substantially at the joint between the free end of the transverse leg of the end molding section and the adjacent extremity of one of the elongated shaping members of the central mold section. The axis of pivoting is substantially spaced from the molding surface adjacent the free end of the longitudinal leg of the end molding member in the closed mold position.

In the illustrative embodiment of the present invention, the central molding section is rigidly attached to a mold support carriage or means, and the hinge means are rigidly attached to the mold support means. Weight means is attached to each end molding section and is located inwardly of the hinge means for pivoting the attached end molding section upward in response to softening of the glass sheet. The axis of pivoting is located longitudinally outward of the regions of sharpest bend.

The present invention will be understood more readily after a study of the description which follows of a specific embodiment of the present invention.

In the drawings which form part of the present disclosure and wherein like reference numerals refer to like structural elements, FIG. 1 is a perspective view of one embodiment of the present invention in the spread mold position showing a flat glass sheet mounted thereon preparatory to bending;

FIG. 3 is a sectional view of a longitudinal end portion of the mold taken along the lines III—III of FIG. 1;

FIG. 4 is a plan view of the portion seen in section in FIG. 3; and

FIG. 5 is a simplified schematic perspective view of an outline bending mold and a glass sheet showing the relative positions thereof in the open and closed mold position and omitting support structure, actuating means and other structural elements for the purpose of demonstrating the manner in which the illustrative embodiment of the present invention operates.

Figure 1:
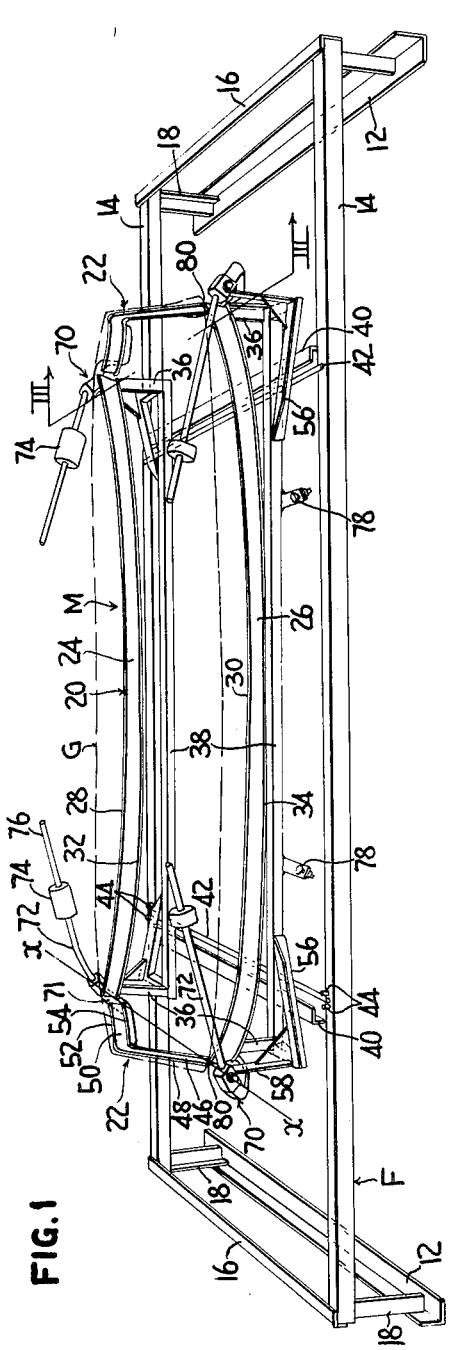

Referring to the drawings, a mold M is supported on a mold frame F. The mold frame comprises a pair of angle iron runners 12 extending transversely of the frame F to support the latter for transverse movement through a tunnel-like furnace (not shown). The runners 12 provide this movement by riding along the top of rotating rolls (not shown) disposed throughout the furnace length as part of a roll-type conveyor.

The frame F comprises a superstructure including longitudinally extending angle irons 14 interconnected at their ends by means of transversely extending angle irons 16. Short vertical angle irons 18 extend upward from adjacent each end of each of the runners 12 to each of the four corners where the longitudinally extending angle irons 14 meet the transversely extending angle irons 16.

The mold M comprises a central mold section 20 flanked by a pair of end molding sections 22. The central mold section 20 includes a pair of elongated shaping rails 24 and 26 of inverted T-cross section. Each of these shaping rails comprises an elongated shaping member extending along the opposite longitudinal sides of an outline shaping surface provided by the mold M as will be explained later.

Shaping rail or member 24 has an upper edge surface 28 while shaping rail or member 26 has an upper edge surface 30. The upper edge surfaces 28 and 30 conform to the shape desired along the longitudinal side portions of the outline mold shaping surface.

Shaping member 24 has a horizontally disposed reinforcing rail 32 attached to its lower edge surface; a similar reinforcement 34 is attached to the bottom edge surface of shaping rail 26. Each of the shaping member 24 and 26 is additionally reinforced by suitable vertically extending connecting members 36 which extend downward from each end of the shaping members 24 and 26 and are interconnected by means of longitudinally extending reinforcing members 38. The latter in turn are interconnected by means of welding to transversely extending angle irons 40 which maintain a proper transverse spacing between the shaping members 24 and 26 of the central molding section 20.

Angle irons 40 extend transversely of the mold longitudinally inward of the extremities of the center section rails 24 and 26. They lie in substantially the same vertical planes that intersect the laterally opposed regions of sharpest curvature on the upper shaping surfaces 28 and 30 of the center section rails.

A pair of cross rods 42 having ends extending beyond the longitudinal extremities of the transversely extending angle irons 40 are rigidly attached to the longitudinally extending reinforcing members 38. The cross rods 42 extend the entire distance between the longitudinally extending angle irons 14 of the mold support frame F. A pair of abutments 44 is provided on each angle iron 14 to receive each end of one of said cross rods 42 to insure proper alignment of the mold M with respect to the mold supporting frame F. The other cross rod 42 slidably rests on the upper surfaces of the angle irons 14 to avoid possible mold warpage resulting from thermal expansion and contraction of the mold.

Each end mold section includes a bent shaping member comprising a transversely extending leg 46 having an upper edge surface 48 and a longitudinally extending leg 50 having an upper edge surface 52. Reinforcing members 54 similar to reinforcements 32 and 34 are attached to the bottom edge surface of the transversely extending leg 46 and of the longitudinally extending leg 50.

An obliquely extending support member 56 is attached at its inner extremity by means such as spot welding to the outer surface of each of the longitudinally extending reinforcing members 38 and extends across the upper surface of each of the transversely extending angle irons 40 and beyond to provide a support for a vertical bar 58 having a knife-edge upper surface.

Referring to FIG. 3, a nut 60 is rigidly attached to the outer edge of the vertical bar 58 at its upper edge. A housing 62 having an inner wall 64 notched in the form of an inverted V-shape is pivotally supported on the upper knife edge surface of each vertical bar 58. Housing 62 has an outer wall 66 that is apertured to receive a bolt 68. The aperture of the apertured outer wall 66 has a diameter slightly larger than the bolt 68 which is screw-threadedly received by the nut 60. The elements 58 to 68 inclusive form a hinge 70.

Each pair of hinges 70 disposed transversely from one another serves as a hinge means for pivoting each end molding section 22 with respect to a longitudinal extremity of the central molding section for movement between a spread position for supporting a flat glass sheet for bending and a closed mold position wherein the free ends of the transverse legs 46 are in juxtaposition to the longitudinal extremities of shaping member 26 and the free end of the longitudinal legs 50 are in juxtaposition to the longitudinal extremities of the other elongated shaping member 24 of the central molding section 20.

In order to pivot the end molding sections 22 with respect to the central molding section 20, the housings 62 are connected to the reinforcing members 54 by means of attaching rods 71. A weight arm 72 is attached at its outer extremity to each housing 62. A weight 74 is attached to each arm 72 longitudinally inward of the hinge means 70 with respect to the longitudinal axis of the mold M.

The inner ends 76 of the weight arms 72 rotate with respect to the hinges 70 in substantially vertical planes. Their downward motion is limited by the location of stop members 78 rigidly attached to the longitudinal extending reinforcing members 38.

Figure 2:
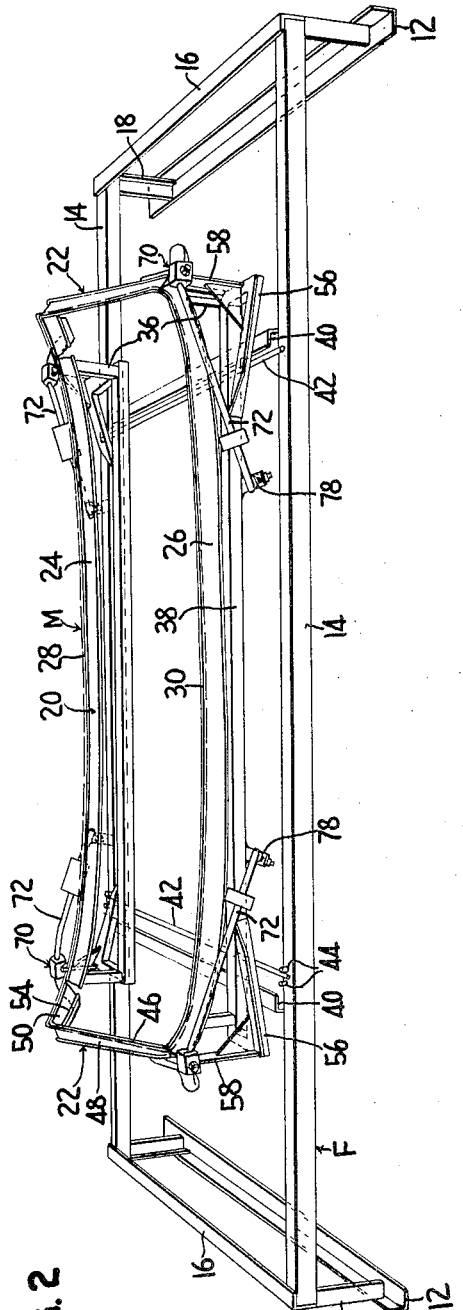
FIG. 2 is a view similar to that of FIG. 1 showing the mold in its closed position after the glass sheet has undergone bending.

When the inner ends 76 of the weight arms 72 contact the stop members 78 as seen in FIG. 2, the upper edge surfaces 28 and 30 of the shaping rails 24 and 26 of the central molding section 20, the upper edge surfaces 48 of the transverse legs 46 and the upper edge surfaces 52 of the longitudinal legs 50 form a substantially continuous outline shaping surface conforming to the shape desired for the bent glass sheet.

The hinges 70 are disposed as a pair of hinges for each end molding section 22. The line $x$—$x$ (FIGS. 1, 3, and 4) interconnecting the laterally opposed hinges of each pair for each hinge section extends across the upper shaping surface substantially at a longitudinal extremity 80 of the upper edge surface 30 of center molding section rail 26. At the opposite side of the mold, pivot axis $x$—$x$ intersects the other center section shaping rail 24 below its upper edge surface 28 and inward of its longitudinal extremity 82. Thus, the axis of pivoting for the end mold section defined by a pair of laterally spaced hinges extends across the upper shaping surface substantially at the point of juxtaposition between the free end of transverse leg 46 and the adjacent longitudinal extremity 80 of the elongated shaping member 26 of the central molding section. The axis $x$—$x$ is substantially spaced from the mold shaping surface adjacent the free edge of longitudinal leg 50. By this construction, each end mold section 22 is free to pivot into the spread mold position with the upper edge surface 48 of its transverse leg 46 occupying the same horizontal plane as the extremities 80 and 82 of the center section rail upper edge surfaces 28 and 30.

In order to bend one or more glass sheets on the mold described above, the mold M disposed in its usual position resting on a mold supporting frame F is conveyed on a conveyor, preferably of the stub roll type, with its runners 12 resting on the upper surfaces of the conveyor rolls (not shown). The end molding sections 22 are pivoted outward and downward with respect to the central molding section 20 until their outermost corners 84 lie in a common plane with the extremities 80 and 82 of the center section rails. The straight line distance between the corners 84 in the spread mold position is substantially equal to the curved length of the mold in the closed mold position. Therefore, the spread mold supports the flat glass sheet at elements 80, 82 and 84.

Since the location of the hinge axis $x$—$x$ has been chosen to provide an oblique axis of pivoting for reasons stated above, the flat glass is also supported across its width by the upper edge surface 48 of transverse leg 46.

The glass sheets to be bent are previously cut to a substantially trapezoidal shape with their side edges of substantially parallel and slightly arcuate shape and their longitudinal ends disposed angularly with respect to one another. The upper edge surface 48 of each of the transversely extending legs 46 of each end molding section 22 supports the bottom surface of the flat glass sheet along substantially its entire width adjacent its longitudinal edge as shown clearly in FIG. 3 from a corner 84 formed by the intersection of the upper edge surface 48 of the transverse leg 46 and the upper edge surface 52 of the longitudinal leg 50 of each end molding section to the laterally opposite corner adjacent longitudinal extremity 80 of center section rail 26.

The flat glass sheet G is balanced in a horizontal plane and prevented from pivoting about its longitudinal axis by virtue of the fact that the line of support between the flat glass support points 80 and 84 along the upper edge surface 48 extends to opposite sides of the longitudinal axis passing through the center of gravity of the glass sheet.

It is again noted that the flat glass sheet is also supported intermediate its extremities longitudinally outwardly of the regions of sharpest curvature on the longitudinal extremity 82 of the central molding section rail 24 and the longitudinal extremity 80 of rail 26. The mold is so constructed that the lower margin of the ultimate windshield after bending is initially supported intermediate its ends on longitudinal ends 82 of rail 24, spaced from the ends of the glass while the upper margin is supported on longitudinal ends 80 of rail 26 near the glass sheet ends. Thus, any kinks inherent in windshields produced by prior art windshields are limited to the windshield regions below the normal vision area. Normally, a driver or other automobile passenger does not look at the automobile hood, but at an overhead traffic light. Hence, it usually suffices if the areas of distortion are located near the bottom only of the curved windshield.

The weights 74 attached to the inner ends of the weight arms 72 provide a sufficient force for the end sections to furnish an upward thrust that initially supports the flat glass and subsequently when the glass has been softened by the application of heat, lifts the heat-softened glass upward and causes it to assume the shape of the outline shaping surface of the mold in its closed position. Since all the initial support regions for the flat glass lie longitudinally outward of the region of sharpest bending, the tendency for the glass sheet to kink during shaping is minimized.

The glass is heat-softened by conveying the glass-laden mold and its supporting frame transversely through a tunnel-like lehr where the glass is subjected to elevated temperatures sufficient to soften the glass and permit the weights 74 to lift the end molding sections 22 upward to fold the end portions of the glass outside the sharply bent regions while assisting in the shaping of the glass by gravity sagging toward the mold shaping surfaces 28 and 30. Since the lifting force is applied across substantially the entire width of the glass sheet, any tendency for the tip of the glass sheet to overbend and produce "tip curl" is minimized.

In attempting to produce a typical 1962 production windshield, the first attempts were made using prior art molds of the type in which the center section rails terminated inward of the axis of sharpest bend. Much of the bent glass was unsatisfactory because of "cross car distortion." When the mold construction was modified as suggested by the present invention, this unsatisfactory condition was overcome.

Increasing the length of the center section shaping rails, relocating the hinges and decreasing the mass of the end mold sections as taught by the present invention made possible a reduction in mass of the weights actuating upward pivoting of 22.5 pounds per mold. This made possible avoidance of "tip curl" and reduction in thermal input per part produced. Losses due to "cross car distortion" were virtually eliminated after the mold construction was changed. Also, the change in construction reduced losses due to longitudinal and transverse misalignment considerably.

The form of the invention described herein represents an illustrative preferred embodiment. It is understood that various changes may be made without departing from the spirit of the invention as defined in the claimed subject matter which follows.

What is claimed is:
1. A sectionalized outline mold for bending glass sheets comprising:
   (a) a central molding section including
      ($a_1$) a pair of elongated shaping members extending along the opposite longitudinal sides of an outline shaping surface, and
   (b) a pair of end molding sections, each including
   (c) a bent shaping member consisting essentially of:
      ($c_1$) a transversely extending leg and
      ($c_2$) a longitudinally extending leg,
   (d) hinge means pivotally supporting each end molding section for movement between a spread position for supporting a flat glass sheet for bending and a closed mold position wherein the free ends of said transverse legs are in juxtaposition to the longitudinal extremities of one of said elongated shaping members and the free ends of said longitudinal legs are in juxtaposition to the longitudinal extremities of said other one of said elongated shaping members,
   (e) each of said shaping members having an upper surface conforming to a different portion of said outline shaping surface.

2. A mold as in claim 1, wherein said hinge means for each end section comprises:
   ($d_1$) a pair of hinges for each end molding section, the line interconnecting said pair of hinges extending across the upper shaping surface substantially at the point of juxtaposition between said free end of one of said transverse legs and the adjacent longitudinal extremity of said one of said elongated shaping members.

3. A mold as in claim 2, wherein said axis is substantially spaced from the shaping surface adjacent the free end of said longitudinal leg.

4. A mold as in claim 1, further including:
   (f) mold support means,
   (g) means rigidly connecting said central molding section to said mold support means,
   (h) means rigidly connecting said hinge means to said mold support means, and
   (i) weight means attached to each said end molding section and located inward of said hinge means for pivoting said attached end molding section upward in response to softening of a supported glass sheet.

5. A mold as in claim 1, wherein
   ($a_1'$) each of said elongated shaping members has a pair of longitudinal extremities lying in a substantially horizontal plane, and
   ($c'$) each bent shaping member pivots into a position wherein its longitudinally outer end is located in said plane and is spaced from the longitudinally outer end of the other bent shaping member a straight line distance substantially equal to that of the curved line distance between said longitudinally outer ends when the mold members assume the closed mold position.

References Cited by the Examiner
UNITED STATES PATENTS
2,924,045  2/1960  Startzell _____ 65—288

FOREIGN PATENTS
770,131  3/1957  Great Britain.

DONALL H. SYLVESTER, *Primary Examiner.*

A. D. KELLOGG, *Assistant Examiner.*